US012406577B2

(12) United States Patent
Balachandran

(10) Patent No.: US 12,406,577 B2
(45) Date of Patent: Sep. 2, 2025

(54) PHASE LOCK LOOP SIREN DETECTION

(71) Applicant: Waymo LLC, Mountain View, CA (US)

(72) Inventor: Ganesh Balachandran, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 168 days.

(21) Appl. No.: 18/339,610

(22) Filed: Jun. 22, 2023

(65) Prior Publication Data

US 2023/0351891 A1 Nov. 2, 2023

Related U.S. Application Data

(63) Continuation of application No. 17/667,907, filed on Feb. 9, 2022, now Pat. No. 11,727,798, which is a continuation of application No. 17/130,480, filed on Dec. 22, 2020, now Pat. No. 11,282,382.

(51) Int. Cl.

| | |
|---|---|
| ***G08G 1/087*** | (2006.01) |
| ***G08B 1/08*** | (2006.01) |
| ***G08G 1/0965*** | (2006.01) |
| ***G08G 1/0967*** | (2006.01) |

(52) U.S. Cl.
CPC ............... *G08G 1/087* (2013.01); *G08B 1/08* (2013.01); *G08G 1/0965* (2013.01); *G08G 1/096791* (2013.01)

(58) Field of Classification Search
CPC ................. G08G 1/087; G08G 1/0965; G08G 1/096791; G08B 1/08
See application file for complete search history.

(56) References Cited

U.S. PATENT DOCUMENTS

| | | | |
|---|---|---|---|
| 3,626,365 | A | 12/1971 | Press et al. |
| 3,859,623 | A | 1/1975 | Koehler |
| 4,209,769 | A | 6/1980 | Chronerberry |
| 4,238,778 | A | 12/1980 | Ohsumi |
| 4,625,206 | A | 11/1986 | Jensen |
| 4,759,069 | A | 7/1988 | Bernstein et al. |
| 4,956,866 | A | 9/1990 | Bernstein et al. |

(Continued)

FOREIGN PATENT DOCUMENTS

| | | | |
|---|---|---|---|
| CN | 102474541 | A | 5/2012 |
| CN | 111045033 | A | 4/2020 |

(Continued)

OTHER PUBLICATIONS

Noam R. Shabtai, Eli Tzirkel, "Detecting the direction of emergency vehicle sirens with microphones", EAA Spatial Audio Signal Processing Symposium, Sep. 2019, Paris, France, pp. 137-142.

*Primary Examiner* — Chico A Foxx
(74) *Attorney, Agent, or Firm* — MCDONNELL BOEHNEN HULBERT & BERGHOFF LLP

(57) ABSTRACT

One example system for detecting an emergency siren comprises a microphone device, a band pass filter operably coupled to the microphone device and configured to filter sound data from the microphone device to produce filtered sound data, a phase lock loop circuit configured to phase filter the filtered sound data to produce phase filtered data, and a processor configured to determine a presence of a siren signal from the phase filtered data.

20 Claims, 10 Drawing Sheets

(56) References Cited

U.S. PATENT DOCUMENTS

| | | | | |
|---|---|---|---|---|
| 5,278,553 | A | 1/1994 | Cornett et al. | |
| 5,287,411 | A | 2/1994 | Hill et al. | |
| 5,495,242 | A | 2/1996 | Kick et al. | |
| 5,710,555 | A * | 1/1998 | McConnell | G08G 1/0965 340/904 |
| 6,087,961 | A | 7/2000 | Markow | |
| 6,171,168 | B1 | 1/2001 | Jessop | |
| 6,362,749 | B1 | 3/2002 | Brill | |
| 7,675,431 | B1 | 3/2010 | Caouette, Sr. | |
| 8,094,040 | B1 * | 1/2012 | Cornett | G08G 1/087 340/916 |
| 9,278,689 | B1 * | 3/2016 | Delp | G08G 1/0965 |
| 9,397,630 | B2 * | 7/2016 | Wang | H03G 9/025 |
| 10,547,941 | B1 * | 1/2020 | Herman | B60Q 5/005 |
| 10,650,677 | B2 | 5/2020 | Silver et al. | |
| 11,282,382 | B1 | 3/2022 | Balachandran | |
| 11,567,510 | B2 * | 1/2023 | Leenayongwut | G06N 20/00 |
| 11,727,798 | B2 | 8/2023 | Balachandran | |
| 11,804,239 | B2 * | 10/2023 | Buddhadev | G01S 11/14 |
| 2004/0155770 | A1 | 8/2004 | Nelson et al. | |
| 2005/0058303 | A1 | 3/2005 | Martin et al. | |
| 2005/0074131 | A1 | 4/2005 | Mc Call et al. | |
| 2006/0050897 | A1 | 3/2006 | Asada et al. | |
| 2006/0099918 | A1 | 5/2006 | Yamaguchi | |
| 2007/0146127 | A1 | 6/2007 | Stilp et al. | |
| 2008/0001780 | A1 | 1/2008 | Ohno et al. | |
| 2008/0069364 | A1 | 3/2008 | Itou et al. | |
| 2008/0170472 | A1 * | 7/2008 | Yonak | G01S 5/18 367/129 |
| 2008/0304677 | A1 | 12/2008 | Abolfathi et al. | |
| 2010/0046764 | A1 | 2/2010 | Wolff | |
| 2010/0208902 | A1 | 8/2010 | Yoshizawa et al. | |
| 2010/0329473 | A1 | 12/2010 | Rauhala | |
| 2011/0221610 | A1 | 9/2011 | Abreu | |
| 2016/0070788 | A1 * | 3/2016 | Vrazic | H04R 3/005 707/769 |
| 2016/0155452 | A1 * | 6/2016 | Sharifi | G10L 19/06 381/56 |
| 2017/0011619 | A1 | 1/2017 | Bass et al. | |
| 2018/0050698 | A1 * | 2/2018 | Polisson | G05D 1/0061 |
| 2018/0070170 | A1 * | 3/2018 | Nakadai | H04R 1/406 |
| 2018/0072222 | A1 * | 3/2018 | Herbert | B60Q 1/46 |
| 2018/0074162 | A1 * | 3/2018 | Jones | G06Q 10/08 |
| 2018/0211528 | A1 | 7/2018 | Seifert | |
| 2018/0237033 | A1 * | 8/2018 | Hakeem | B62D 1/04 |
| 2018/0374347 | A1 | 12/2018 | Silver et al. | |
| 2019/0028792 | A1 | 1/2019 | Zeng et al. | |
| 2019/0315375 | A1 | 10/2019 | Li et al. | |
| 2020/0064856 | A1 | 2/2020 | Silver et al. | |
| 2020/0116869 | A1 | 4/2020 | Lennen | |
| 2020/0150919 | A1 | 5/2020 | Rand et al. | |
| 2020/0213728 | A1 * | 7/2020 | Lopatka | G01S 3/8083 |
| 2020/0238981 | A1 * | 7/2020 | Seo | G08G 1/166 |
| 2020/0241552 | A1 * | 7/2020 | Leenayongwut | H04R 3/005 |
| 2021/0103747 | A1 * | 4/2021 | Moustafa | G06F 18/25 |
| 2022/0343658 | A1 * | 10/2022 | Nolasco | G06V 20/582 |

FOREIGN PATENT DOCUMENTS

| | | | | |
|---|---|---|---|---|
| DE | 102004045670 | A1 | 2/2006 | |
| DE | 102019213697 | A1 * | 3/2021 | B60W 30/095 |
| GB | 2350425 | A | 11/2000 | |
| JP | 2010067165 | A * | 3/2010 | |
| JP | 2015022453 | A * | 2/2015 | |

* cited by examiner

PHASE LOCK LOOP SIREN DETECTION

CROSS-REFERENCE TO RELATED APPLICATIONS

This application is a continuation of U.S. patent application Ser. No. 17/667,907, filed Feb. 9, 2022, which is a continuation of U.S. patent application Ser. No. 17/130,480, filed Dec. 22, 2020. The foregoing applications are incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include microphones, lasers, sonar, radar, cameras, and other devices that scan and record data from the vehicle's surroundings. These devices in combination (and in some cases alone) may be used to determine the location of the object in three-dimensional space.

Data from the various types of sensors is processed to identify objects or other obstacles in the environment around the vehicle. The vehicle is autonomously controlled based in part on the identification of the objects in the environment.

Emergency vehicles use audible sirens to alert drivers of their presence. The sirens used by emergency vehicles typically use frequency modulated signals.

SUMMARY

In one example, a system for identifying an emergency siren comprises a microphone, a first filter, a band pass filter, a phase lock loop circuit, a processor, and computer readable memory. The microphone, first filter, and band pass filter are operably coupled such that sound data from the microphone is filtered by the first filter and the band pass filter to produce filtered data. The filtered data is phase filtered by the phase lock loop circuit to produce phase filtered data. The processor processes the phase filtered data.

In another example, a method of identifying an emergency siren comprises detecting sound signals with a microphone, filtering the sound signals with a high pass filter, filtering the sound signals with a band pass filter, and FM-phase filtering the sound signals with a phase lock loop circuit.

In a further example, a system for detecting emergency vehicles comprises a first sensor configured to detect solid objects in the environment around the system, a plurality of microphones configured to detect sound signals in the environment around the system, a first filter configured to filter the sound signals, a band pass filter configured to filter the sound signals, a phase lock loop circuit configured to phase filtered the sound signals, and a processor configured to compare the phase filtered sound signals from the plurality of microphones to determine a direction to a source of a frequency modulated signal and further configured to identify a solid object detected by the first sensor as a source of the frequency modulate signal.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

A vehicle, such as an autonomous vehicle, can utilize data from multiple sensors, such as active sensors, such as light detection and ranging (LIDAR) devices and radio detection and ranging (RADAR) devices to generate a representation of a scanned environment and detect objects therein. The autonomous vehicle can also utilize passive sensors, such as cameras, microphones, GPS units, passive infrared sensors, and passive radio frequency sensors. The data from the multiple sensors can be used to identify the detected objects within the scanned environment and estimate the distance between the vehicle and the identified objects.

The vehicle further includes a controller that controls the movement of the vehicle based in part on the identified objects within the environment. In some examples, a first sensor, such as a LIDAR device, scans the environment around a vehicle to detect objects. A microphone detects sound signals in the environment around the vehicle. A processor compares the data from the microphone and the first sensor to associate at least one sound signal with at least one object.

The vehicle further includes a system for identifying emergency siren signals within the detected sound signals. The system filters and phase filters the detected sound signals. The filtered and phase filtered data is compared to stored emergency siren data to determine if the sound signals include a siren signal. If a siren signal is associated with an object detected by the first sensor, the vehicle controller operates the vehicle appropriately to avoid interfering with the emergency vehicle (e.g., pulls the vehicle over to allow the emergency vehicle to pass).

Example devices, systems, and methods herein relate to detecting emergency sirens. One example system may include a microphone operably coupled to a first filter and a band pass filter. The first filter and the band pass filter, filter sound data to generate filtered sound data. The filtered sound data is input into a phase lock loop circuit to be phase filtered to produce phase filtered data. The phase filtered data is in turn input into a processor for processing.

Figure 1:
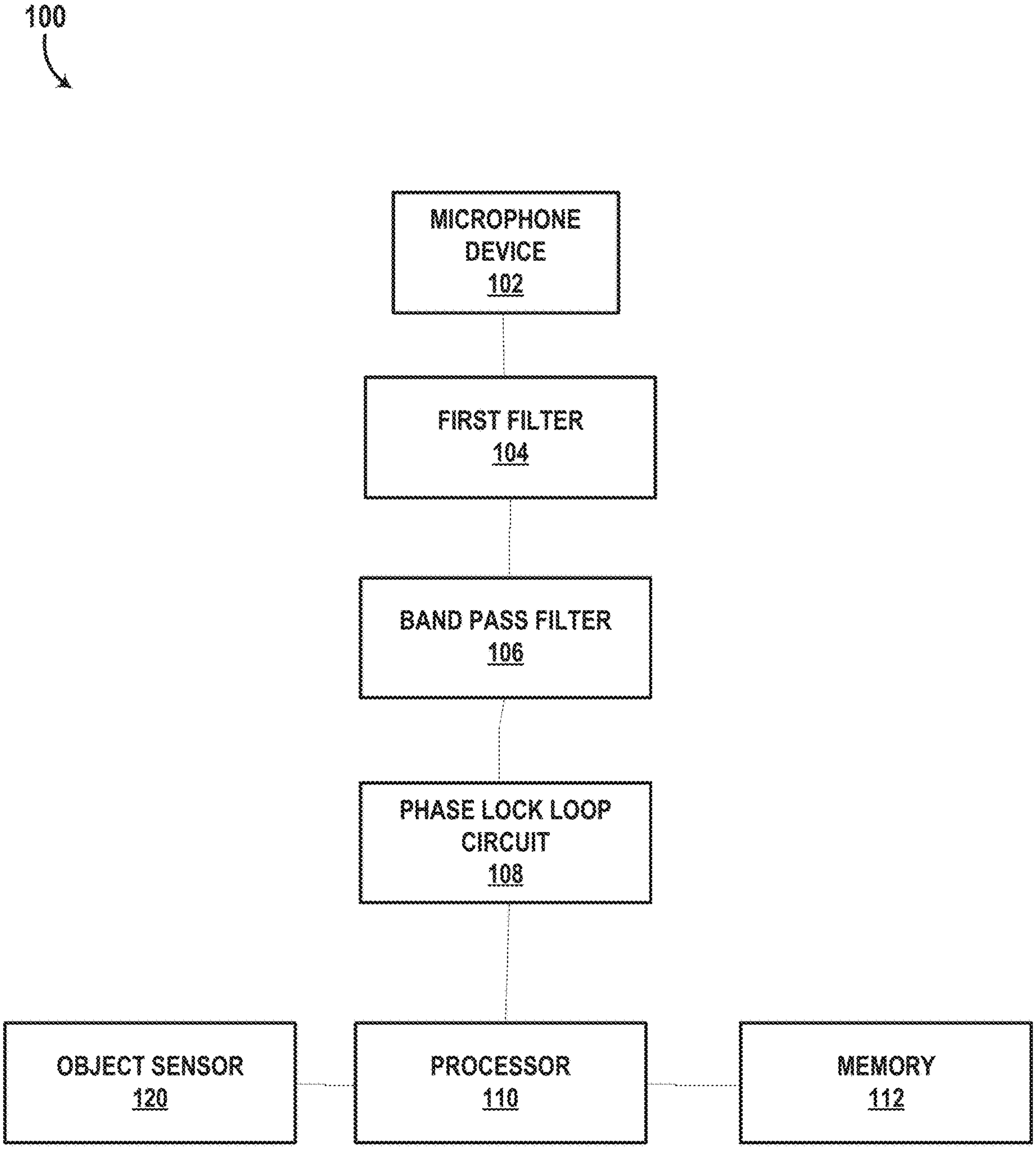
FIG. 1 is a simplified block diagram of a system, according to example embodiments.

FIG. 1 illustrates a system 100 having a microphone device 102, a first filter 104, a band pass filter 106, a phase lock loop circuit 108, a processor 110, and computer readable memory 112. In some examples, the system 100 further includes at least one object sensor 120.

The microphone device 102 includes at least one microphone configured to detect sound signals in the environment around the system 100. When the system 100 is part of a vehicle, the microphone device 102 is configured to detect sound signals originating outside of the vehicle. In one example, the microphone device 102 includes 3 or more microphones arranged on the exterior of the vehicle, or in fluid communication with the exterior of the vehicle.

Figure 2A:
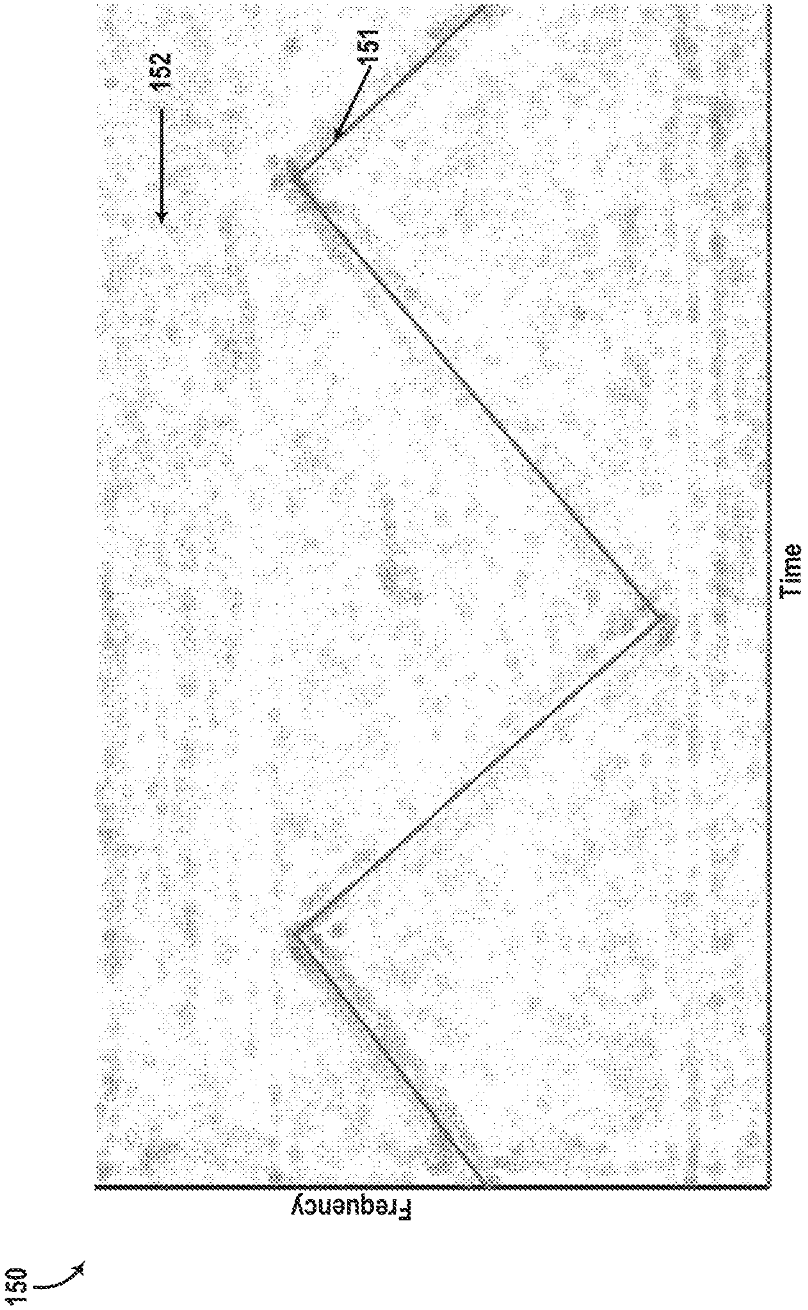
FIG. 2A illustrates unfiltered sound data as used in the system of FIG. 1.

FIG. 2A illustrates example sound data 150. FIG. 2A is a graph of frequency vs. time in which the darkness of an area represents the amplitude of the sound at that frequency. As shown, the sound data includes a frequency modulated signal 151. The sound data also includes additional sound data, or noise 152, outside of the frequency modulated signal.

Returning to FIG. 1, the first filter 104 is operably coupled to the microphone device 102 so as to receive sound data therefrom. The first filter 104 is a fixed frequency filter such that the frequency of sound data filtered remains fixed over time. In some embodiments, the first filter 104 comprises a high pass filter configured to remove data from the sound data having a frequency below a predetermined threshold. Alternatively or additionally, the first filter 104 comprises a low pass filter configured to remove data having a frequency above a second predetermined threshold. In some examples, the first filter 104 is configured to filter out sound data outside of the range of frequencies used for typical emergency sirens. In one example, the first filter 104 is configured to remove data having a frequency below about 500 hertz. Alternatively or additionally, the first filter is configured to remove data having a frequency above about 1700 hertz.

Figure 2B:
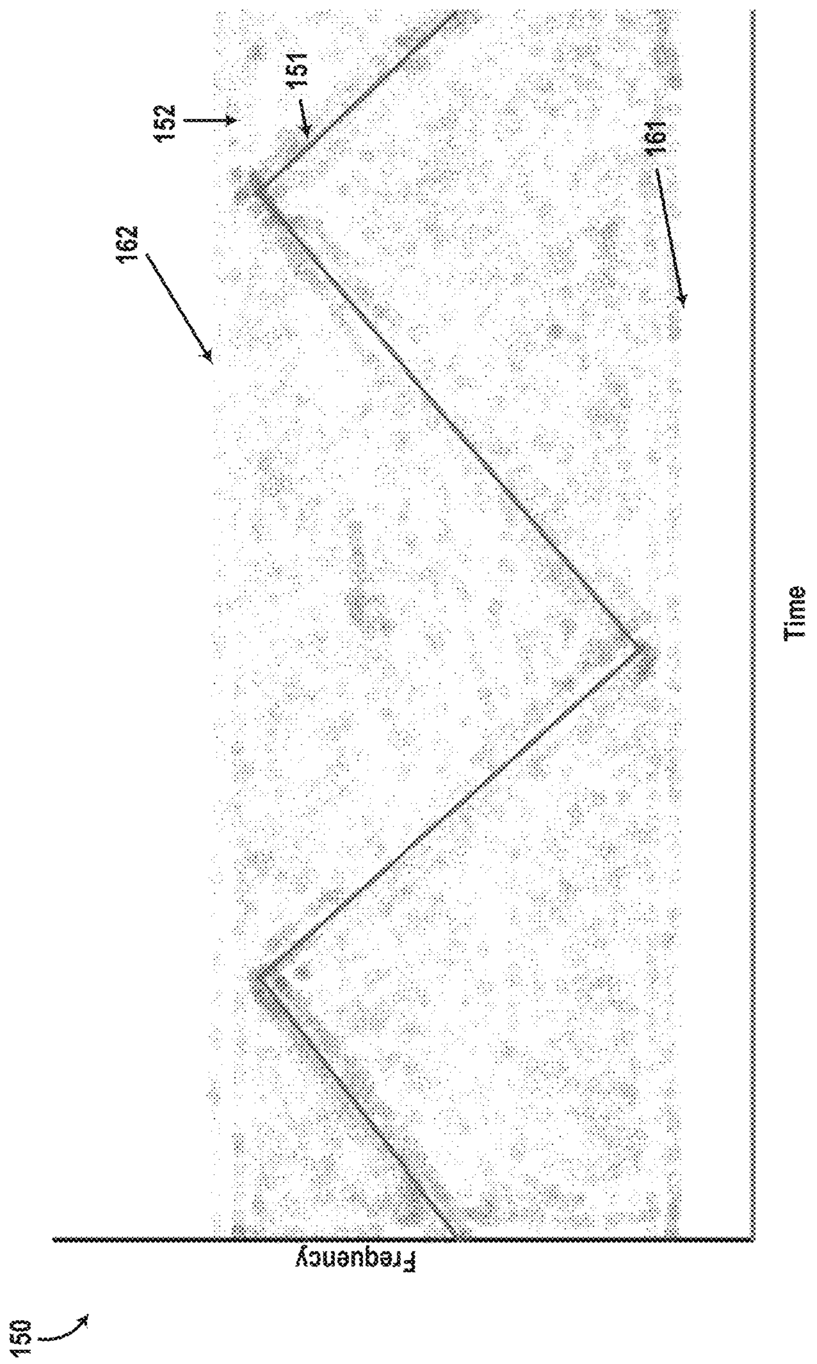
FIG. 2B illustrates sound data exiting the first filter of FIG. 1.

FIG. 2B illustrates the sound data 150 after having been filtered by the first filter 104. The first filter 104 removed sound data below a low threshold frequency 161 and sound data above a high threshold frequency 162. Accordingly, the amount of noise 152 in the sound data is reduced.

The band pass filter 106, as shown in FIG. 1, is configured to further filter the sound data. The band pass filter 106 is a variable frequency filter such that the frequency of sound data filtered can vary over time. The band pass filter 106 is configured to output a band of sound data surrounding the highest amplitude sound signal therein. As the frequency having the highest amplitude in the sound data changes over time, the frequency range of the band output changes accordingly.

The band pass filter 106 is configured to remove sound data having a frequency at least a first predetermined value above the highest amplitude frequency. The band pass filter 106 is further configured to remove sound data having a frequency at least a second predetermined value below the highest amplitude frequency. In some forms, the first predetermined value and the second predetermined value are equal.

Figure 2C:
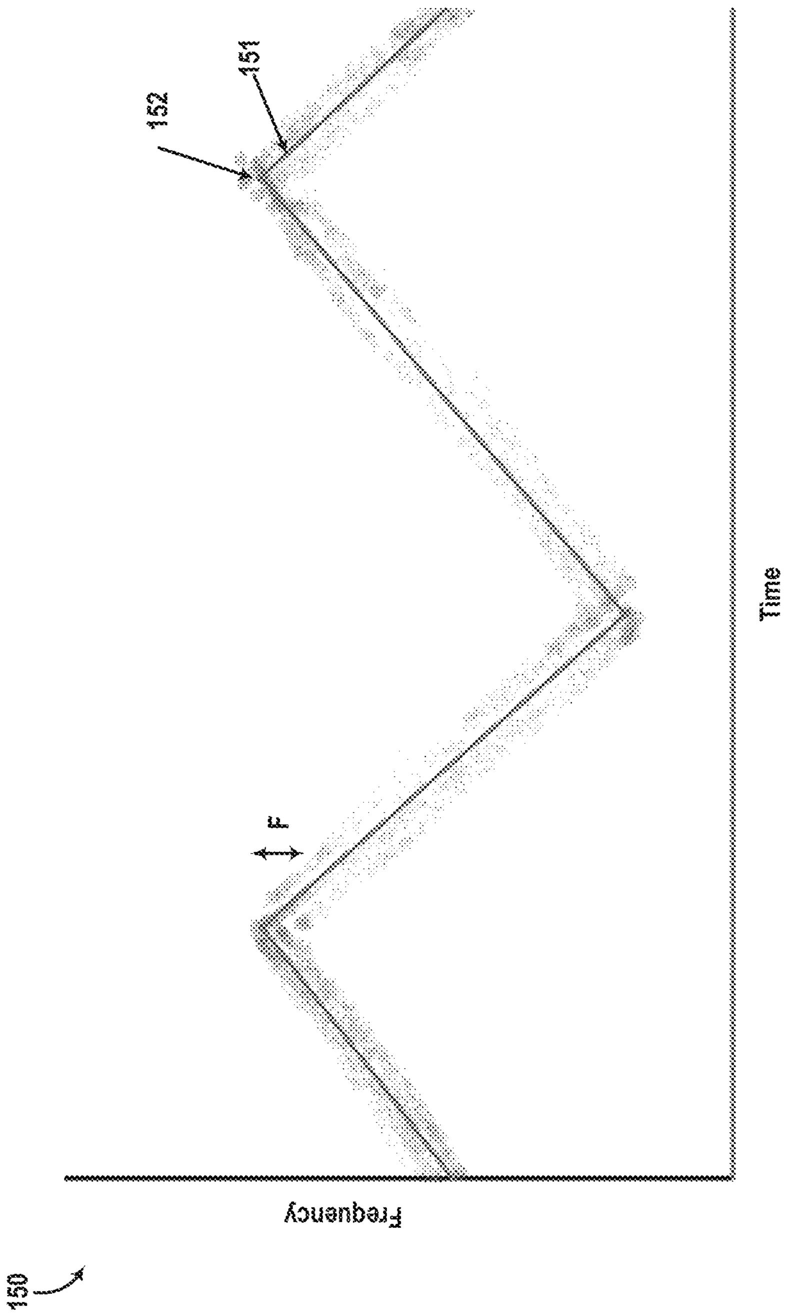
FIG. 2C illustrates sound data exiting the band pass filter of FIG. 1.

FIG. 2C illustrates the sound data 150 after being filtered by the band pass filter 106. As shown, the output sound data 150 includes a band of data substantially following the phase of the frequency modulated signal 151. At each given time, the band of sound data includes sound data within a threshold value of F hertz of the frequency modulated signal 151.

The phase lock loop circuit 108 receives the filtered sound data and phase filters frequency modulated sound signals contained therein. In some embodiments, the phase lock loop circuit 108 is an analog or digital phase lock loop circuit having a variable frequency oscillator and a phase detector. In operation, the phase detector compares the filtered sound data to the output of the variable frequency oscillator to determine if they are in phase (i.e., if the frequency is changing at the same rate). If the two signals are not in phase, the variable frequency oscillator is adjusted.

When the phase detector determines that the filtered sound data and the variable frequency oscillator signal are in phase, the phase data is output therefrom as phase filtered or phase filtered sound data.

In some embodiments, one or more components of the phase lock loop circuit 108 comprise a processor and computer readable memory configured to virtually perform the operation described above. In some forms, the phase lock loop circuit 108 comprises the processor 110 and computer readable memory 112 of the system 100.

Figure 3:
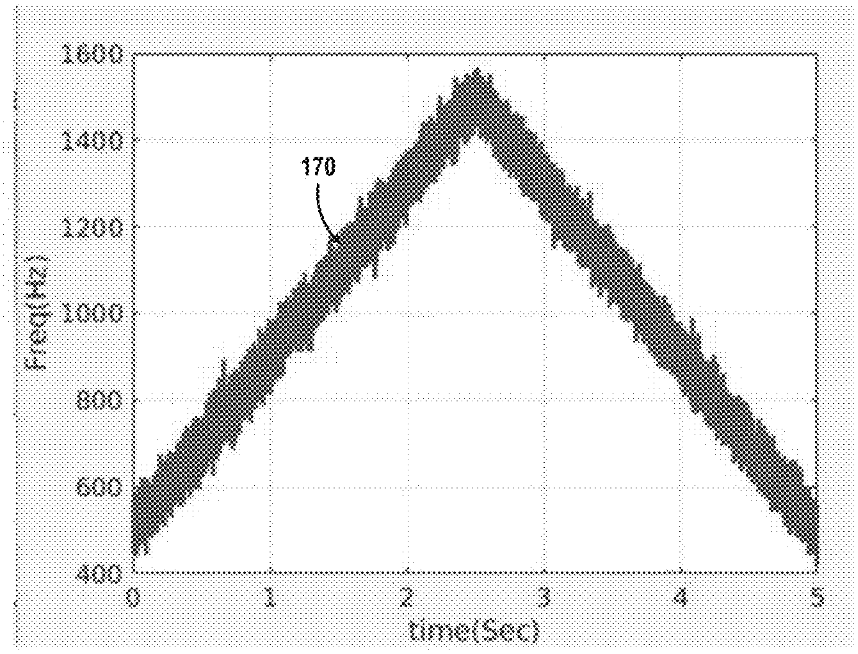
FIG. 3 illustrates the phase filtered output of the phase lock loop circuit of FIG. 1.
Figure 4A:
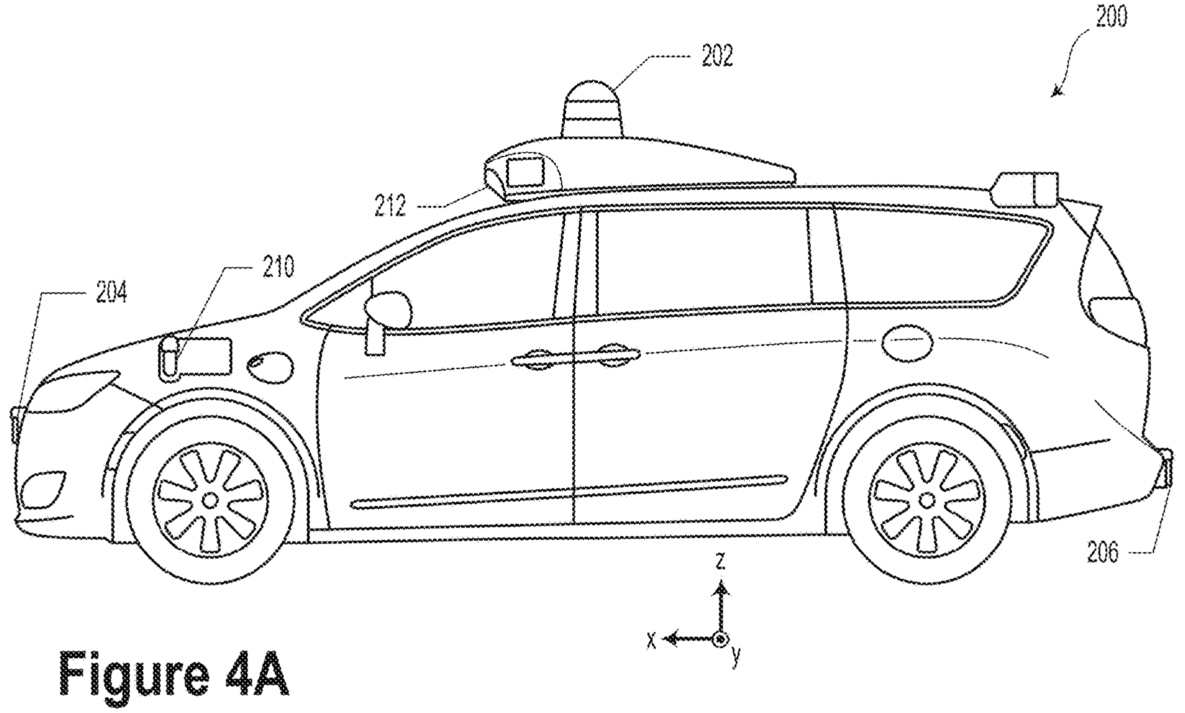
FIG. 4A illustrates a vehicle equipped with a sensor system, according to an example embodiment.
Figure 4B:
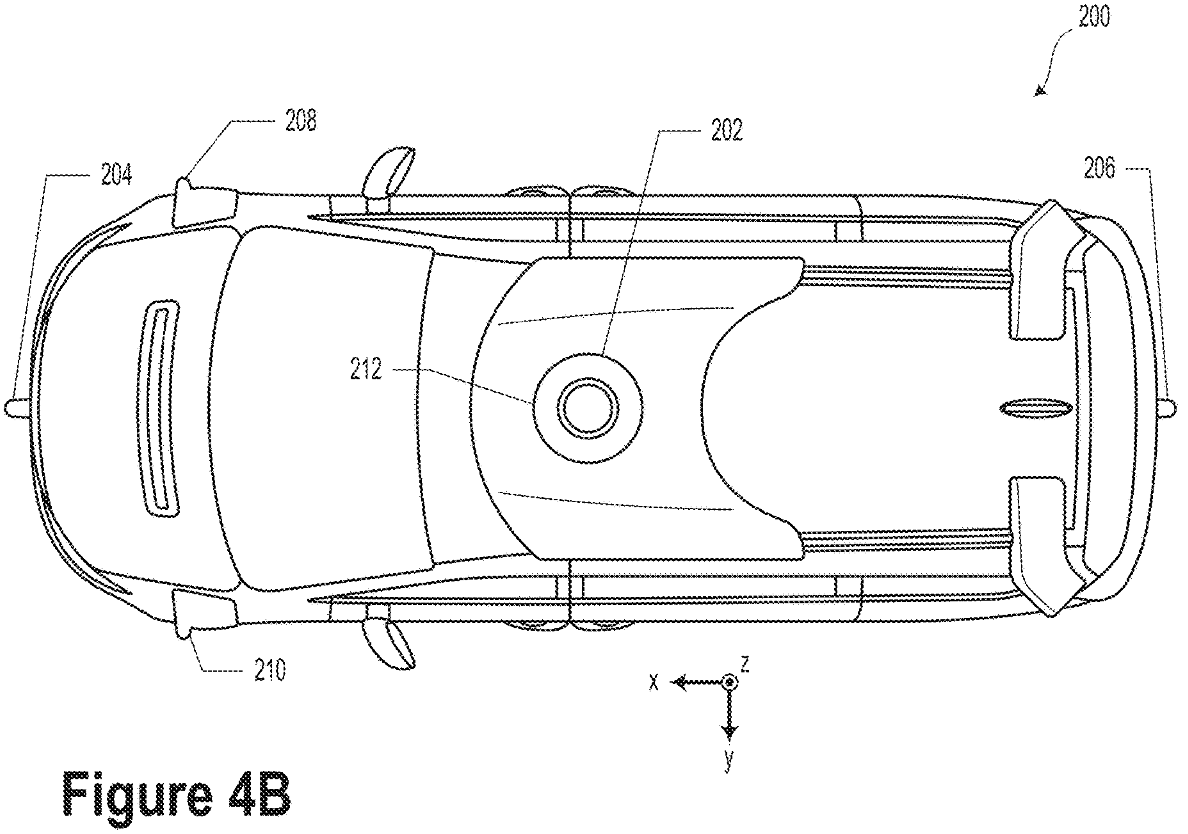
FIG. 4B illustrates a vehicle equipped with a sensor system, according to an example embodiment.
Figure 4C:
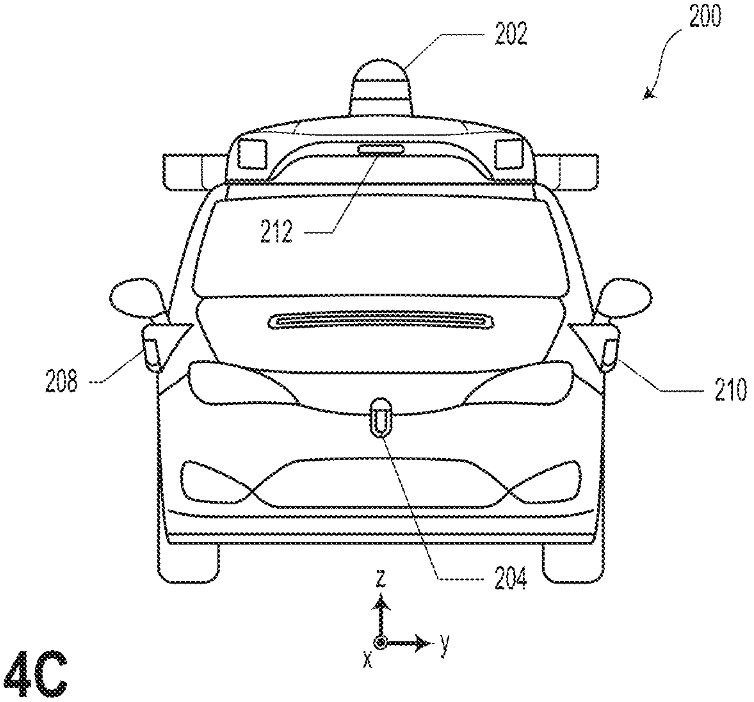
FIG. 4C illustrates a vehicle equipped with a sensor system, according to an example embodiment.
Figure 4D:
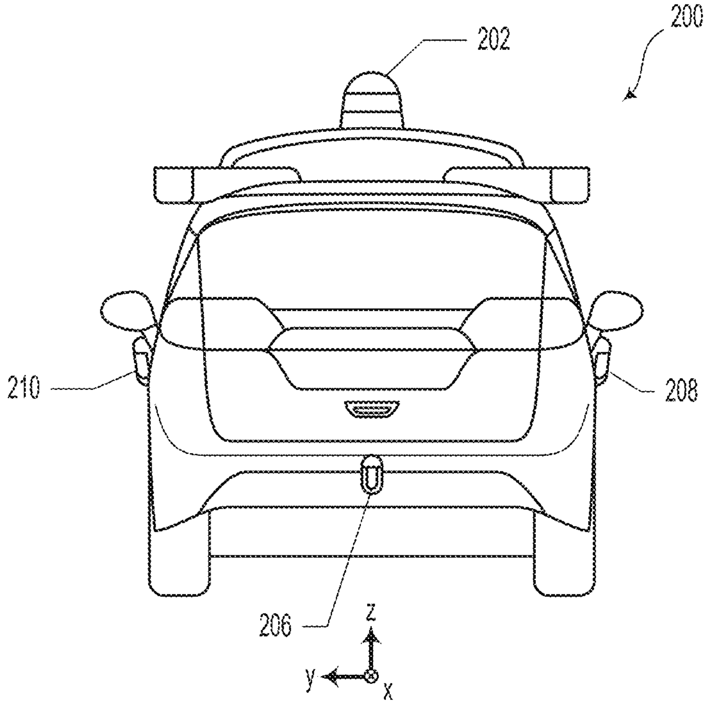
FIG. 4D illustrates a vehicle equipped with a sensor system, according to an example embodiment.
Figure 4E:
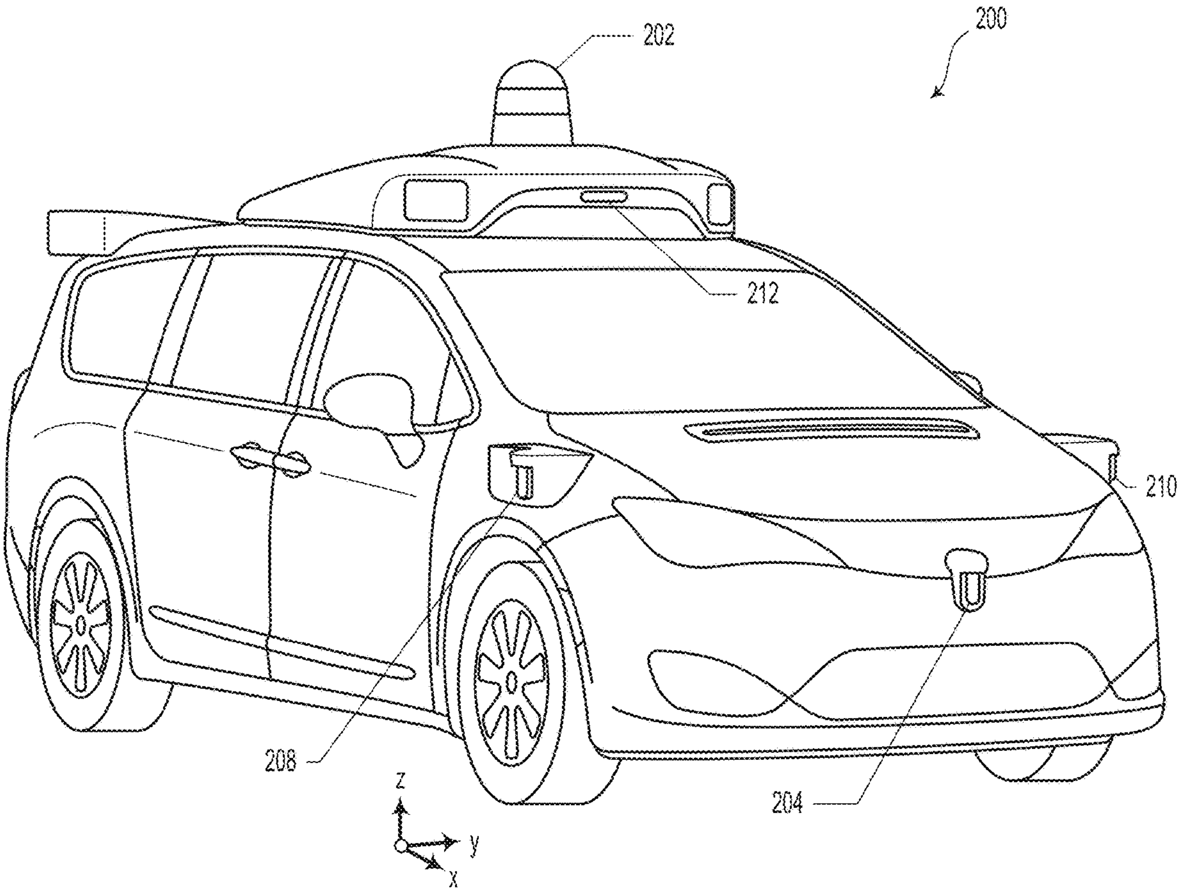
FIG. 4E illustrates a vehicle equipped with a sensor system, according to an example embodiment.

FIG. 3 illustrates a phase filtered siren signal 170. As shown, the phase filtered siren signal 170 includes data representing a change in frequency over time. The edges of the phase filtered siren signal 170 illustrate the noise 152 in the sound data 150. The filtering described above reduces the noise 152 and thus increases the accuracy of the phase filtered siren signal 170. In some examples, the phase lock loop circuit 108 outputs a two dimensional ("2D") chart illustrating frequency vs. time. The chart can be color coded to indicate the amplitude of the sound.

The computer readable memory 112 stores executable instructions that when executed by the processor 110 cause the processor to process the phase filtered data to identify emergency siren signals. In some forms, the computer readable memory 112 stores a database of known siren signal data. The processor 110 compares the phase filtered data to the known siren signal data. If the phase filtered data substantially matches a signal in the known siren signal data, the processor 110 determines that the sound data contained an emergency siren signal.

Execution of the instructions can further cause the processor 110 to determine a source of the emergency siren signal. In some forms, the microphone device 102 includes a plurality of microphones. The processor compares the phase filtered sound data from a plurality of microphones to triangulate a direction to the source of the siren signal. The processor 110 compares at least one of the amplitude of the phase filtered sound data or the timing of the phase filtered sound signal to determine which of the plurality of microphones is closest to the source of the siren signal.

In some forms, the system 100 includes an object sensor 120. The object sensor 120 is a sensor configured to detect one or more solid objects in the environment around the system 100. Example object sensors 120 include active sensors, such as LIDAR sensors or RADAR sensors, or passive sensors, such as cameras. The processor 110 compares the determined direction to the siren signal source and the object data from the object sensor 120 and associates the siren signal with a detected object.

In some forms, the processor 110 can use additional factors to associate the siren signal with an object. In some examples, the processor 110 compares the direction to the siren signal source and a three dimensional ("3D") representation of the environment at multiple points in time to compare movement of the source with movements of one or more objects in the environment. Alternatively or additionally, the processor 110 processes data from a light sensor or camera to visually detect an emergency vehicle. For example, the processor 110 parses image data to identify emergency vehicle indicator lights and compares the location of the identified lights to the direction of the siren signal source.

The processor 110 can be further configured to determine relative movement of the siren signal source and the system 100. In some examples, the processor 110 compares the amplitude of the siren signal over time to determine if the siren signal source is getting closer to the system 100.

The system 100 described above is a system configured to detect a siren signal in an environment around the system 100. In some examples, the system 100 is used within an autonomous vehicle to aid in navigation and operation of the vehicle. FIGS. 4A, 4B, 4C, 4D, and 4E illustrate a vehicle 200, according to an example embodiment. In some embodiments, the vehicle 200 could be a semi- or fully-autonomous vehicle. While FIGS. 4A, 4B, 4C, 4D, and 4E illustrates vehicle 200 as being an automobile (e.g., a passenger van), it will be understood that vehicle 200 could include another type of autonomous vehicle, robot, or drone that can navigate within its environment using sensors and other information about its environment.

In some examples, the vehicle 200 may include one or more sensor systems 202, 204, 206, 208, 210, and 212. In some embodiments, sensor systems 202, 204, 206, 208, 210, and/or 212 could include the microphone device 102 and object sensor 120 as illustrated and described in relation to FIG. 1. In other words, the systems described elsewhere herein could be coupled to the vehicle 200 and/or could be utilized in conjunction with various operations of the vehicle 200. As an example, the system 100 could be utilized to detect emergency vehicles in the proximity of the vehicle 200, so that the vehicle 200 can be controlled to avoid interfering with the emergency vehicle.

While the one or more sensor systems 202, 204, 206, 208, 210, and 212 are illustrated on certain locations on vehicle 200, it will be understood that more or fewer sensor systems could be utilized with vehicle 200. Furthermore, the locations of such sensor systems could be adjusted, modified, or otherwise changed as compared to the locations of the sensor systems illustrated in FIGS. 4A, 4B, 4C, 4D, and 4E.

One or more of the sensor systems 202, 204, 206, 208, 210, and/or 212 could include LIDAR sensors. For example, the LIDAR sensors could include a plurality of light-emitter devices arranged over a range of angles with respect to a given plane (e.g., the x-y plane). For example, one or more of the sensor systems 202, 204, 206, 208, 210, and/or 212 may be configured to rotate about an axis (e.g., the z-axis) perpendicular to the given plane so as to illuminate an environment around the vehicle 200 with light pulses. Based on detecting various aspects of reflected light pulses (e.g., the elapsed time of flight, polarization, intensity, etc.), information about the environment may be determined.

In an example embodiment, sensor systems 202, 204, 206, 208, 210, and/or 212 may be configured to provide respective point cloud information that may relate to physical objects within the environment of the vehicle 200. The point cloud information can be used to identify objects within the environment around the vehicle 200, which can be identified as the source of a siren sound detected by the microphone device 102. While vehicle 200 and sensor systems 202, 204, 206, 208, 210, and 212 are illustrated as including certain features, it will be understood that other types of sensor systems are contemplated within the scope of the present disclosure.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 4A-4E illustrate various lidar sensors attached to the vehicle 200, it will be understood that the vehicle 200 could incorporate other types of sensors.

The vehicle 200 may also include additional types of sensors mounted on the exterior thereof, such as the temperature sensor, sound sensor, LIDAR sensor, RADAR sensor, SONAR sensor, and/or cameras described above. Each of these additional types of sensors would be communicably coupled to computer readable memory.

Figure 5:
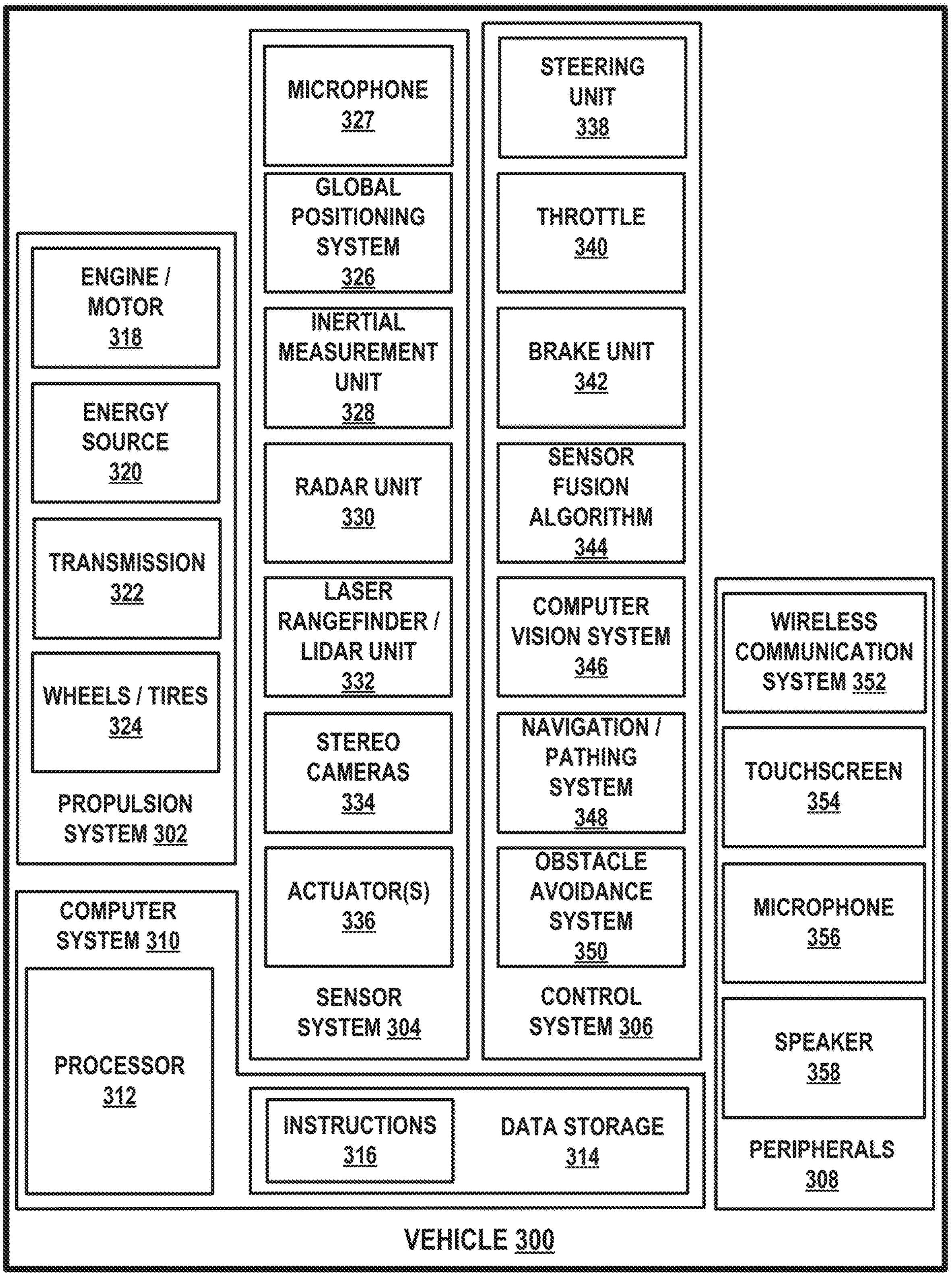
FIG. 5 is a simplified block diagram of a vehicle, according to example embodiments.

FIG. 5 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. The sensor system 304 further includes computer readable memory which receives and stores data from the sensors. As shown, sensor system 304 includes a microphone device 327, a Global Positioning System (GPS) 326, an inertial measurement unit (IMU) 328, a RADAR unit 330, a laser rangefinder and/or LIDAR unit 332, and a stereo camera system 334. Sensor system 304 may include additional sensors as well, including, for example, sensors that monitor internal systems of the vehicle 300 (e.g., an 02 monitor, a fuel gauge, an engine oil temperature, etc.). Other sensors are possible as well.

The sensor system 304 can include the microphone device 102 and object sensor 120 of the system 100 described above. In some examples, the sensor system 304 includes a plurality of filters, a phase lock loop circuit, and a processor for processing data from the microphone device 327, such as described in the system 100 above.

The microphone device 327 may be any sensor (e.g., acoustic sensor) configured to detect and record sounds originating outside of the vehicle 300. The microphone device 327 can include a plurality of individual acoustic sensors. In some forms, the plurality of acoustic sensors are located at various location of the vehicle 300. Alternatively, the plurality of acoustic sensors are located within a signal microphone module to form an acoustic sensor array.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, at least some of which may take the form of devices 100 and/or 200 among other LIDAR device configurations, for instance.

The stereo cameras 334 may be any cameras (e.g., a still camera, a video camera, etc.) configured to capture images of the environment in which the vehicle 300 is located.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350. In some examples, the control system 306 includes a processor configured to identify emergency siren signals and identify the location of the source of the emergency siren signals, such as the processor 110 described above.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The sensor fusion algorithm 344 is operated on a processor, such as the external processor discussed above. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by stereo cameras 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, microphone 327, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

In some examples, the computer system 310 is configured to execute instructions stored in computer readable memory to identify siren signals within recorded sound data. The computer system 310 can further process the sound data, and data from other sensors, to determine a direction to, location of, or relative movement of the source of the siren signal.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

Figure 6:
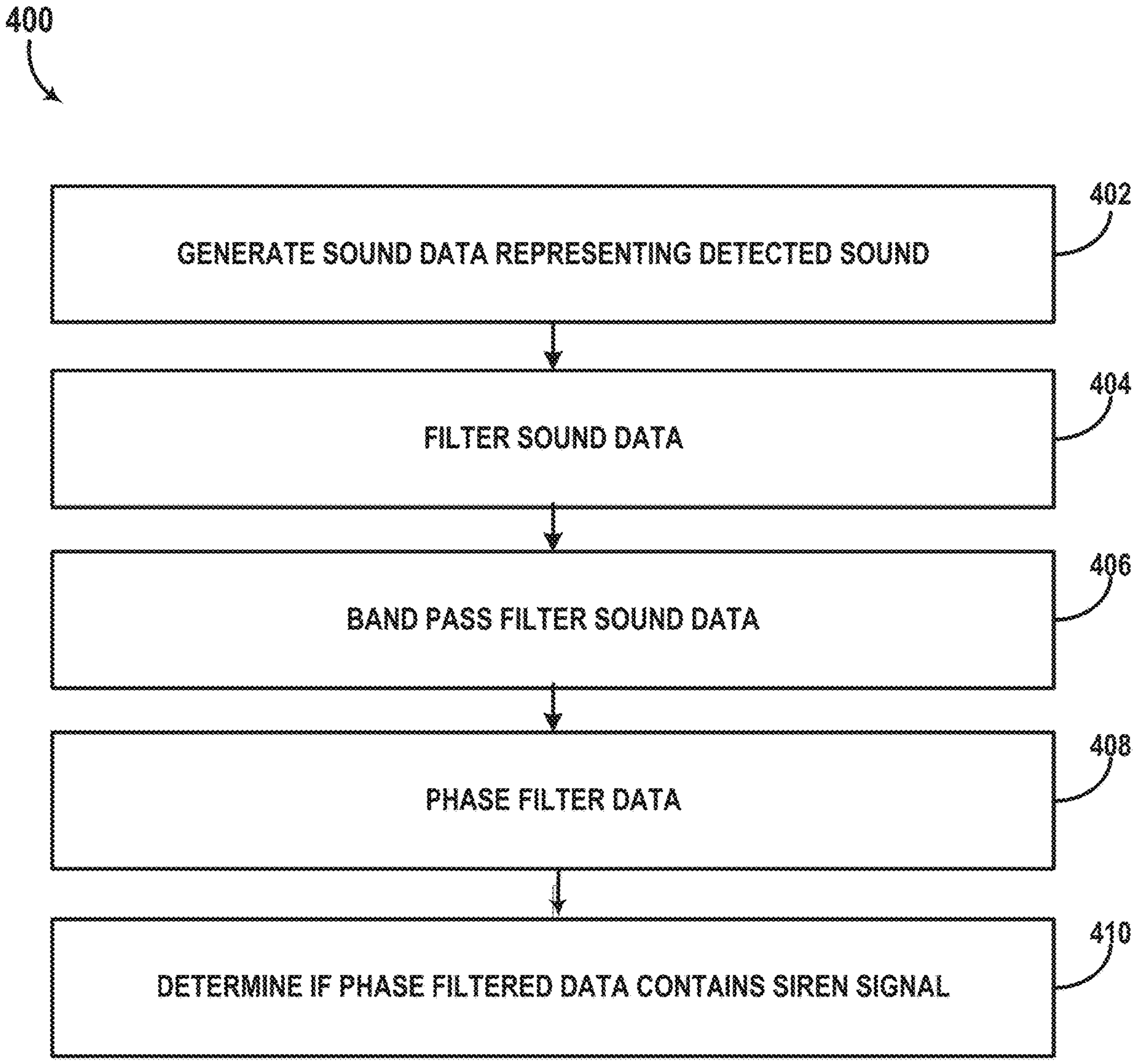
FIG. 6 is a flowchart of a method, according to example embodiments.

FIG. 6 is a flowchart of a method 400, according to example embodiments. The method 400 presents an embodiment of a method that could be used with the system 100 or the vehicles 200 and 300, for example. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

The method 400 is a method of detecting an emergency siren signal. In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 400 and other processes and methods disclosed herein, each block in FIG. 6 may represent circuitry that is wired to perform the specific logical functions in the process.

At block 402, method 400 involves generating sound data representing detected sounds in the environment. Generating sound data can involve detecting sound with an acoustic sensor, such as a microphone, and outputting an electrical signal representing the detected sound from the microphone.

At block 404, the method 400 involves filtering the sound data using a fixed frequency filter. The fixed frequency filter comprises a low pass filter, a high pass filter, or a combination thereof. The fixed frequency filter removes data from the sound data representing sounds having a frequency above a predetermined high frequency threshold or below a predetermined low frequency threshold. In one example, block 404 involves removing data having a frequency above about 1700 hertz or below about 500 hertz.

At block 406, the sound data is filtered by a band pass filter. The band pass filter is a variable frequency filter that filters out data representing sound based on the highest amplitude sound. In some examples, the band pass filter removes data representing sound having a frequency at least a predetermined number of hertz different from the frequency of the highest amplitude sound at that time.

At block 408, the filtered sound data is phase filtered by a phase lock loop circuit. Phase filtering involves determining the phase of a frequency modulated signal within the sound data. In some examples, the phase is determined by comparing the sound data to the signal of a variable frequency oscillator.

At block 410, the method 400 determines if the phase filtered sound data contains an emergency siren signal. In some forms, the phase filtered signal is compared to stored emergency siren signals. If the phase filtered signal matches a stored emergency siren signal, the processor determines that the sound data contains an emergency siren signal.

In some embodiments, the method 400 contains additional steps for determining the source of the siren signal as described with respect to FIG. 1 above. Determining the source of the siren signal can include determining a direction to the source, determining the relative movement of the source to the system, and/or associating the siren signal with an object detected by an object sensor. In some forms, the method 400 further comprises operating a vehicle based on the detected siren signal. For example, the system operates an indicator, such as a light or alarm, to notify a driver that a siren signal was detected. Alternatively or additionally, and autonomous or semiautonomous vehicle adjusts the speed and/or direction based on the detection of the siren signal to avoid interfering with the path of the emergency vehicle.

The above examples of systems and methods for detecting an emergency siren signal and specifically sensor systems for autonomous vehicles configured to detect an emergency siren signal. It is understood that the systems and methods should not be limited to sensor systems or to autonomous vehicles. The systems and methods for detecting an emergency siren signal can be used in other systems having an acoustic sensor, including nonautonomous or semiautonomous vehicles, traffic lights, gateways or other barriers.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A system comprising:

a plurality of microphones configured to generate sound data;

an object sensor configured to generate object data indicative of one or more objects in an environment of the system; and a processor, wherein the processor is configured to perform operations comprising:

detecting a siren signal based on the sound data from the plurality of microphones;

determining, based on the sound data from the plurality of microphones, directions to a source of the siren signal at multiple points in time; and based on the determined directions and the object data, associating the siren signal with an object in the environment of the system, wherein associating the siren signal with the object in the environment of the system comprises comparing the directions to the source of the siren signal at the multiple points in time with movements of the object in the environment of the system.

2. The system of claim 1, wherein determining, based on the sound data from the plurality of microphones, the directions to the source of the siren signal at multiple points in time comprises:

determining which of the plurality of microphones is closest to the source of the siren signal.

3. The system of claim 2, wherein determining which of the plurality of microphones is closest to the source of the siren signal comprises:

comparing at least one of an amplitude or a timing of the sound data from the plurality of microphones.

4. The system of claim 1, wherein the plurality of microphones comprises at least three microphones.

5. The system of claim 1, further comprising:

a phase filtering circuit configured to phase filter the sound data generated by the plurality of microphones to produce phase filtered sound data from the plurality of microphones, wherein detecting the siren signal based on the sound data from the plurality of microphones comprises detecting the siren signal based on the phase filtered sound data from the plurality of microphones.

6. The system of claim 1, wherein the object sensor comprises at least one of a light detection and ranging (LIDAR) sensor, a radio detection and ranging (RADAR) sensor, or a camera.

7. The system of claim 1, wherein the object in the environment of the system comprises at least of an emergency vehicle or an emergency vehicle indicator light.

8. The system of claim 1, wherein the operations further comprise:

detecting the object in the environment of the system based on the object data.

9. The system of claim 1, wherein the operations further comprise:

determining a relative movement of the source of the siren signal and the system.

10. The system of claim 1, wherein the plurality of microphones and the object sensor are coupled to a vehicle.

11. The system of claim 10, wherein the operations further comprise:

controlling the vehicle based on the detected siren signal.

12. The system of claim 11, wherein controlling the vehicle based on the detected siren signal comprises:

adjusting at least one of a speed or a direction of the vehicle based on the detected siren signal.

13. The system of claim 10, wherein the operations further comprise:

providing a notification of the detected siren signal to a driver of the vehicle.

14. A method, comprising:

generating, by a plurality of microphones coupled to a vehicle, sound data;

generating, by an object sensor coupled to the vehicle, object data indicative of one or more objects in an environment of the vehicle;

detecting, by a processor, a siren signal based on the sound data from the plurality of microphones;

determining, by the processor and based on the sound data from the plurality of microphones, directions to a source of the siren signal at multiple points in time; and based on the determined directions and the object data, associating, by the processor, the siren signal with an object in the environment of the vehicle, wherein associating the siren signal with the object in the environment of the vehicle comprises comparing the directions to the source of the siren signal at the multiple points in time with movements of the object in the environment of the vehicle.

15. The method of claim 14, wherein determining, by the processor and based on the sound data from the plurality of microphones, the directions to the source of the siren signal at the multiple points in time comprises:

determining which of the plurality of microphones is closest to the source of the siren signal.

16. The method of claim 15, wherein determining which of the plurality of microphones is closest to the source of the siren signal comprises:

comparing at least one of an amplitude or a timing of the sound data from the plurality of microphones.

17. The method of claim 14, wherein the object sensor comprises at least one of a light detection and ranging (LIDAR) sensor, a radio detection and ranging (RADAR) sensor, or a camera.

18. The method of claim 14, further comprising:

determining a relative movement of the source of the siren signal and the vehicle.

19. The method of claim 14, further comprising:

controlling the vehicle based on the detected siren signal.

20. The method of claim 19, wherein controlling the vehicle based on the detected siren signal comprises:

adjusting at least one of a speed or a direction of the vehicle based on the detected siren signal.

* * * * *